Oct. 31, 1950     A. S. MACKENZIE     2,528,376

COMBINATION BALE TIE AND CONNECTOR

Filed Aug. 1, 1947

A. S. MACKENZIE
INVENTOR
Lester B. Clark
BY Ray L. Smith
Attorneys.

Patented Oct. 31, 1950

2,528,376

UNITED STATES PATENT OFFICE 2,528,376

COMBINATION BALE TIE AND CONNECTOR

Alexander S. Mackenzie, Houston, Tex., assignor to Super Density Tie Connector Corporation, Galveston, Tex., a corporation of Texas Application August 1, 1947, Serial No. 765,429

1 Claim. (Cl. 24—23)

This invention relates to an improvement in a combination bale tie and holder of the type generally used in confining cotton and similar materials in bale form.

While the following description refers specifically to the problems and the manner of securing cotton in bales for handling, it is to be understood that the invention may be used in connection with the binding of other materials in bale form.

The cotton bale when formed at the gin is large and of low density and the six ties which are used to bind the bale are necessarily long. When the bale arrives at the compress where it is to be formed into a smaller and high density bale, the ties are removed and cut to a shorter length required for the high density bale. The severed pieces are, in many cases, spliced together to make three additional ties, as the high density bale requires nine ties. All of such ties must be equipped with high density buckles or holders, as the common gin buckle possesses insufficient strength. After splicing to form the three additional ties, there is still left a surplus of short pieces of tie material which constitutes a waste.

An object of the invention is to provide a buckle or holder from the waste material, to which reference has just been made.

Another object of the invention is to provide a tie with a holder which may be reused even after withstanding the pressure exerted by a high density bale.

Still another object is to provide a combination bale tie and holder which presents smooth surfaces free from sharp edges or projections, known as spiders, which are present in most cases on known bale ties and holders.

Still another object is to provide a bale tie and holder that will set when the high density press is released and which will maintain the high density of the bale by preventing creeping of the free end of the tie through the holder.

Still another object of the invention is to provide a combination bale tie and holder including a loop which is made integral with the tie by passing the tie through the loop and thereafter rebending the tie material in a manner to integrate the tie and loop for use.

A still further object of the invention is to reduce the length and the number of ties required to hold a bale of cotton compressed to standard or high density.

The foregoing objects, together with other objects and advantages of the invention will be more fully apparent from the following description taken in connection with the accompanying drawings in which.

Figure 1:
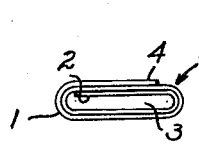
Fig. 1 is an end view of the loop formed and adapted to be integrated with the tie.
Figures 5, 6:
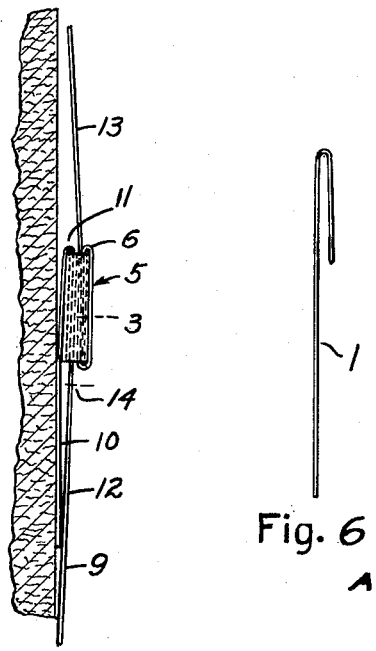
Fig. 5 is a fragmentary view showing the tie and holder in position upon the bale.
Fig. 6 is a side elevational view of a piece of tie which has been severed from the end of a tie used on a low density bale and which is used in forming the holder of the present invention.

The connector or holder is formed of a piece of material 1 such as shown in Fig. 6, the holder being shown in Fig. 1 as comprising two and one quarter turns so that the inner end 2 is at the same side of the opening 3 as the outer end 4. This manner of constructing the connector or holder is effective in making the strain equal on both sides thereof to resist the tendency to spiral or unwind when in use. The elimination of this difficulty, in accordance with the invention, will hereinafter more fully appear.

Figure 2:
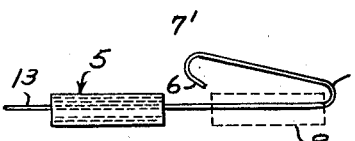
Fig. 2 is a side elevational view showing the form of the tie, and the loop positioned thereon, preliminary to the integration of these elements.

The holder indicated generally at 5 is shown in Fig. 2 as slipped over one end of the tie which is bent back at 7 and is rebent at 7' to form the hook 6. When the holder is moved to the position indicated in dotted outline 8, the end portion of the tie is bent downwardly and a crimping action is effected upon the hook 6, whereby the component parts of the tie and holder assume the relative positions indicated in Fig. 3. The combination bale tie and holder is now completed for use.

Figure 3:
Fig. 3 is a vertical, sectional view through the completed tie and holder.
Figure 4:
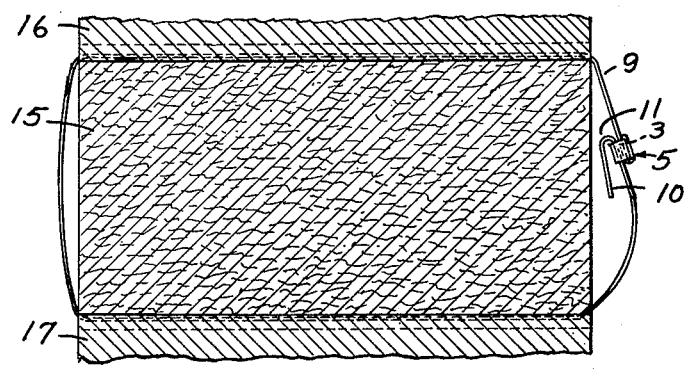
Fig. 4 is a fragmentary cross sectional view of a bale and the platens of a press, the tie and holder of the invention being shown in position about the bale preliminary to releasing the platens for expansion of the bale.

It is to be noted that the holder 5 is so dimensioned that the opening 3 therein is of a width to readily receive the tie 13 preliminary to securing the hooked end thereof to the holder as shown in Fig. 3. Furthermore, the minor dimension of the opening is sufficient that the remaining opening 3' in the combination tie and holder will readily receive the free end 10 of the tie as indicated in Fig. 4. Such free end is bent back at 11 by hand while the bale 15 is held under extreme pressure by the press platens 16 and 17.

After the tie and holder are positioned as shown in Fig. 4, the platens are released to permit expansion of the bale 15. The explosive force of expansion of the bale snaps the tie against the side of the bale and sets the bend 11 as best seen in Fig. 5. The end 10 then lies flat upon the surface of the bale and no slippage can occur. Attention is also directed to the fact that the opposite ends of the tie, within the holder, lie in closely adjacent parallel planes whereby there is little torque tending to rotate the holder about a transverse axis and hence initiate creeping and/or tearing of the tie.

Bales tied with the tie and holder, or connector of the invention have been subjected to supplemental expansive effort and it has been found that even new ties will fail without producing signs of failure in the holder connection.

Under stress, the portion 12 of the tie 13 adjacent the holder 5 pulls downwardly upon the holder, thus pulling the upper portion at 11 slightly outwardly away from the bale. The holder is slightly canted as indicated in Fig. 5 whereby creeping or tearing are avoided. At the same time the hook 6 is restrained from opening and in this manner the objects of the invention are attained.

To remove ties from a bale they may be cut as indicated at 14. The severed end thus provides a strip 1 which may be utilized in the manner already described to form a loop to be used in accordance with the invention.

Broadly the invention comprehends an improved combination bale tie and holder capable of effectively and efficiently holding baled material under high density, such tie and holder comprising, in its entirety, tie material which may be either new or used.

What is claimed is:

A combination bale tie and connector including a connector or loop of rectangular cross section formed of a plurality of wraps of metal strip, the inner and outer ends of said strip overlapping, a tie member having one end passing through the connector and bent back over said overlapped ends, the extreme end of the member being rebent and entering and crimped upon the connector to overlie a portion of the member within the connector and to underlie the innermost of said overlapped ends.

ALEXANDER S. MACKENZIE.

REFERENCES CITED

The following references are of record in the file of this patent:

UNITED STATES PATENTS

| Number | Name | Date |
|---|---|---|
| 65,239 | Lampson | May 28, 1867 |
| 155,413 | Boisseau | Sept. 29, 1874 |
| 188,610 | Durning | Mar. 20, 1877 |
| 231,616 | Riesel | Aug. 24, 1880 |
| 379,878 | Ryan | Mar. 20, 1888 |
| 905,587 | Root | Dec. 1, 1908 |
| 980,311 | Martin | Jan. 3, 1911 |
| 1,969,109 | Taylor et al. | Aug. 7, 1934 |
| 2,188,710 | Giovanini | Jan. 30, 1940 |

FOREIGN PATENTS

| Number | Country | Date |
|---|---|---|
| 16,833 | Great Britain | of 1895 |